(12) United States Patent
Ng et al.

(10) Patent No.: US 6,323,610 B1
(45) Date of Patent: Nov. 27, 2001

(54) SILENT SPIN SINE WAVE GENERATOR

(75) Inventors: Vincent Ng, Alhambra; Bert White, Irvine, both of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/625,292

(22) Filed: Jul. 25, 2000

Related U.S. Application Data

(63) Continuation-in-part of application No. 09/448,571, filed on Nov. 23, 1999, and a continuation-in-part of application No. 09/300,754, filed on Apr. 26, 1999.
(60) Provisional application No. 60/203,129, filed on May 8, 2000, and provisional application No. 60/083,156, filed on Apr. 27, 1998.

(51) Int. Cl.[7] .................................................. H02K 23/00
(52) U.S. Cl. ........................ 318/254; 318/439; 318/138; 318/606; 318/798; 318/812; 318/811
(58) Field of Search ..................... 318/254, 138, 318/439, 606, 798, 812, 811

(56) References Cited

U.S. PATENT DOCUMENTS 6,121,736 * 9/2000 Narazaki et al. ..................... 318/254
6,242,883 * 6/2001 Strunk ................................. 318/767

* cited by examiner

Primary Examiner—Karen Masih
(74) Attorney, Agent, or Firm—W. Daniels Swayze, Jr.; W. James Brady; Frederick J. Telecky, Jr.

(57) ABSTRACT

A method and circuit are presented for operating a polyphase dc motor in which drive voltages are applied to the windings of the motor in predetermined phases. Zero crossings of currents flowing in respective windings of the motor are detected, and phases of the drive voltages are adjusted to have zero crossings substantially simultaneously with the detected zero crossings of the currents flowing in respective windings of the motor. The method includes generating a set of three waveforms (45,46,47) to provide drive voltages to respective windings of the motor. Each waveform has a period of 360° with a first segment (43) having a value of zero for 120°, followed by a second segment (50) having an "up slope" shape for 60°, followed by a third segment (67,68) having two consecutive "cap" shapes for 120°, followed by a fourth segment (52) having "down slope" shape for 60°. Each waveform of said set is displaced from one another by 120°. As a result, the acoustic motor noise is reduced.

26 Claims, 1 Drawing Sheet

SILENT SPIN SINE WAVE GENERATOR

REFERENCES TO APPLICATIONS FROM WHICH PRIORITY IS CLAIMED

This application is a continuation-in-part of co-pending application Ser. No. 09/300,754, filed Apr. 26, 1999, which claimed the benefit of U.S. Provisional Patent Application No. 60/083,156, filed Apr. 27, 1998, and is a continuation-in-part of co-pending application Ser. No. 09/448,571, filed Nov. 23, 1999, all of said applications being incorporated herein by reference. This application also claims priority from U.S. Provisional Patent Application No. 60/203,129, filed May 8, 2000, said application being incorporated herein by reference.

BACKGROUND OF THE INVENTION

1. Field of the Invention

This invention relates to improvements in methods and circuits for driving DC brushless, polyphase motors, such as a spindle motor of a hard disk drive, or the like, and more particularly to improvements in such driving methods and circuits that at least reduce the acoustic noise in motors of this type, and to improvements in driving methods and circuits for driving such motors using driving voltages that are approximations of waveforms constructed from substantially sinusoidal waveform segments, and, more particularly, constructed from substantially linear approximations of such waveform approximations.

2. Relevent Background

In the operation of DC brushless, polyphase motors of the type to which the invention pertains, efficient motor drive requires that the excitation current applied to the motor phases be aligned with the bemf generated by individual phases. One of the best schemes for achieving this alignment is the use of a phase-locked loop (PLL), which adjusts the phase and frequency of the commutation, so that the bemf of the undriven winding passes through zero in the center of the appropriate commutation state. This scheme works well when the shape of the commutation waveforms includes an undriven region, as in a conventional 6-state, +1, +1, 0, −1, −1, 0, sequence.

Since the +1, +1, 0, −1, −1, 0 sequence has sharp transitions between driving states, this sequence has many high frequency components. These tend to excite mechanical resonances in the motor, which results in the creation of undesirable acoustic noise. Moreover, the step-function tristating of the undriven motor phases, together with the step-function driving waveform itself produces a degree of torque ripple in the motor. The torque ripple results in an unevenness or jerkiness in the motor rotation, which also excites resonances in the motor, also causing undesirable acoustic noise.

Thus, if it is desired to reduce acoustic noise, a sine wave shaped excitation signal is more appropriate than the 6-state sequence. If the motor driver consists of sinusoidal current sources, the same voltage sensing PLL described above can be used. However, when the duty cycle of the driver is varied sinusoidally, the motor driver excitation is pulse-width modulated (PWM) to minimize power dissipation in the driver IC. This permits lower cost packaging and an overall saving in system cost. However, in the past, it has been difficult to generate currents that have a pure sinusoidal waveform, particularly when the currents are relatively high, and when a PWM scheme is desired to be used.

In previous application Ser. No. 09/300,754, after initial baseline cancellation, a driving waveform was formed of concatenated segments of 120° of zero, followed by 120° of "up hook", and 120° of "down hook". The up-hook and down-hook waveforms were generated in two MDACS. The operation of the MDACs had some problems that resulted in difficulty in forming the desired driving waveforms. In particular, circuit tradeoffs needed to be made so that the resulting waveforms could properly operate in the polyphase DC motor environment.

Also, using an MDAC to form waveforms segments that are themselves formed from sinusoidal waveforms segment combinations requires special MDAC design and operational considerations. A design in which the driving waveforms can be constructed from linear waveform segments to approximate the sinusoidal waveforms segment combination would significantly ease the realization and operation of such MDAC.

Consequently, what is needed is a disk drive and method for operating it in which the noise associated with the drive in operation is reduced or eliminated. What is additionally needed is a disk drive and method that employs drive signals that are developed from sinusoidal signal segments, which can be easily approximated and generated by concatenated linear signal segments.

SUMMARY OF THE INVENTION

In light of the above, therefore, it is an object of the invention to provide an improved disk drive and method for operating it in which the noise associated with the drive in operation is reduced or eliminated.

It is still another object of the invention to provide a disk drive and method that employs multiple drive signals that have segments that have substantially continuously concatenated waveforms that are constructed from or which approximate segments of a sinusoidal signal.

These and other objects, features and advantages of the invention will be apparent to those skilled in the art from the following detailed description of the invention, when read in conjunction with the accompanying drawings and appended claims.

Thus, according to a broad aspect of the invention, a method is presented for operating a three-phase dc motor. The method includes generating a set of three waveforms to provide drive voltages to respective windings of the motor. Each waveform has period of 360°, with a first segment having a value of zero for 120°, followed by a second segment having an "up slope" shape for 60°, followed by a third segment having two consecutive "cap" shapes for 120°, followed by a fourth segment having "down slope" shape for 60°. Each waveform of the set is displaced from one another by 120°. The waveforms are then applied to the respective windings of the motor. The segments each approximate $VMAG(\sin(\omega t-\phi)-\min\{\sin(\omega t), \sin(\omega t-120°), \sin(\omega t-240°)\})$, where VMAG is the peak amplitude of each waveform, $\omega t$ is a phase angle of the waveform, and $\phi$ is an initial phase angle; however, in a preferred embodiment, the waveform segments comprises at least one linear waveform. Preferably, the waveform segments may have two linear portions, with a breakpoint at a midpoint section thereof.

According to another broad aspect of the invention, a method for reducing acoustic noise in operating a polyphase dc motor is presented. The method includes generating a set of n waveforms to provide drive voltages to respective windings of the motor, n being the number of phases of the polyphase dc motor. Each waveform has period of 360°, and has a first segment value of zero for (360/n)°, a second "up slope" segment for (360/2n)°, a third segment with two consecutive "cap" shapes for (360/n)°, and a fourth "down slope" segment for (360/2n)°. Each waveform of the set is displaced from one another by (360/n)°. The waveforms are applied to the respective windings of the motor to energize it. The waveforms may be pulse-width modulated prior to application thereof to the drivers.

Each of the segments may approximate VMAG(sin(ωt−φ)−min{sin(ωt−0×360/n)°, sin(ωt−1×360/n)°, . . . sin(ωt−(n−1)×360/n)°}), where VMAG is a maximum amplitude of each waveform, n is a number of phases of the motor, ωt is a phase angle of the waveform, and φ is an initial phase angle. The waveform segments may comprise at least one linear waveform, and more particularly may have two linear portions, with a breakpoint at a midpoint section thereof.

According to yet another broad aspect of the invention a circuit is presented for operating an n-phase dc motor. The circuit has drivers for applying n driving signal waveforms to the motor. A source of the driving signal waveforms is provided. Each of the driving signal waveforms has a period of 360° with a first segment having a value of zero for (360/n)°, followed by a second segment having an "up slope" shape for (360/2n)°, followed by a third segment having two consecutive "cap" shapes for (360/n)°, followed by a fourth segment having a "down slope" shape for (360/2n)°. Each waveform of the set is displaced from one another by (360/n)°. The driving signal waveforms may include substantially linear segments, and, more particularly, may have two linear portions, with a breakpoint at a midpoint thereof. A circuit may also be provided for pulse-width modulating the driving signal waveforms prior to application thereof to the drivers.

The segments may each approximate VMAG(sin(ωt−φ)−min{sin(ωt−0×360/n)°, sin(ωt−1×360/n)°, . . . sin(ωt−(n−1)×360/n)°}), where VMAG is the peak amplitude of each waveform, ωt is a phase angle of the waveform, and φ is an initial phase angle.

According to yet another broad aspect of the invention, a disk drive product of the type having a dc brushless, Hall-less, three phase motor for rotating a data containing media is presented. The product includes three driver circuits for providing driving signals to selected respective sets of windings in the motor. A source of three motor drive voltage waveforms provides the drive signals. Each waveform has a period of 360°. A first segment has a value of zero for 120°. A second segment has an "up slope" shape for 60°. A third segment has two consecutive "cap" shapes for 120°, and a fourth segment has a "down slope" shape for 60°. Each waveform of the set is displaced from one another by 120°. The driving signal waveforms may be formed of substantially linear segments, and more particularly of two substantially linear portions, with a breakpoint at a midpoint thereof. The segments may approximate VMAG(sin(ωt−φ)−min{sin(ωt−0×360/n)°, sin(ωt−1×360/n)°, . . . sin(ωt−(n−1)×360/n)°}), where VMAG is the peak amplitude of each waveform, ωt is a phase angle of the waveform, and φ is an initial phase angle.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

In accordance with a preferred embodiment of the invention, the driving waveforms that are applied to the windings of the motor to be driven are derived from sinusoidal waveforms in the manner described in U.S. patent application Ser. No. 09/300,754. The motor may be of the type described above, and, more particularly, of the polyphase, DC motor type described in said U.S. patent application Ser. No. 09/300,754. In the embodiment illustrated, the motor is preferably a three-phase DC motor.

Figure 1:
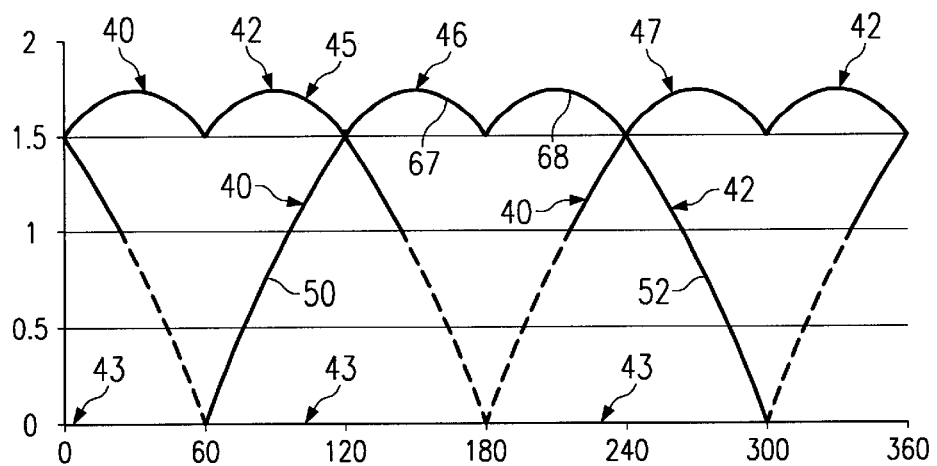
FIG. 1 shows ideal driving signal waveforms for application to a three-phase dc motor.

In the embodiment illustrated, three signals are defined, each displaced in phase 120° from the other for driving each phase of the motor. It should be noted that since the motor windings are typically driven with two of the three coil winding nodes of a "Y" coil configuration being driven and one being used as a sink, it is not necessary to drive each node with a purely sinusoidal waveform. It is sufficient if the differential voltage between two driven nodes is substantially a sinusoidal waveform. A graph showing three consecutive driving waveforms 45, 46, and 47, according to a preferred embodiment of the invention, is shown in FIG. 1. Each of the waveforms 45, 46, at 47 is applied to respective commutatively determined pairs of the input terminals of the motor to be driven.

To construct the driving waveforms 45, 46, and 47, the value of a sinusoidal waveform having the instantaneous minimum value of a set of sinusoidal waveforms 120° out-of-phase with each other is subtracted from the other waveforms. The result is the set of waveforms shown in FIG. 1, which is similar to waveforms described in U.S. patent application Ser. No. 09/300,754. Thus, each of the segments may approximate VMAG(sin(ωt−φ)−min{sin(ωt−0×360/n)°, sin(ωt−1×360/n)°, . . . sin(ωt−(n−1)×360/n)°}), where VMAG is a maximum amplitude of each waveform, n is a number of phases of the motor, ωt is a phase angle of the waveform, and φ is an initial phase angle. Each of the waveforms has an up-hook portion 40 and a down-hook portion 42. Thus, although appearing like sine wave segments, the driving waveform segments are in fact not sine wave segments. Moreover, since each motor phase is tristated for 120° of the commutation cycle, each waveform has a segment 43 that is zero for 120°.

Figure 2:
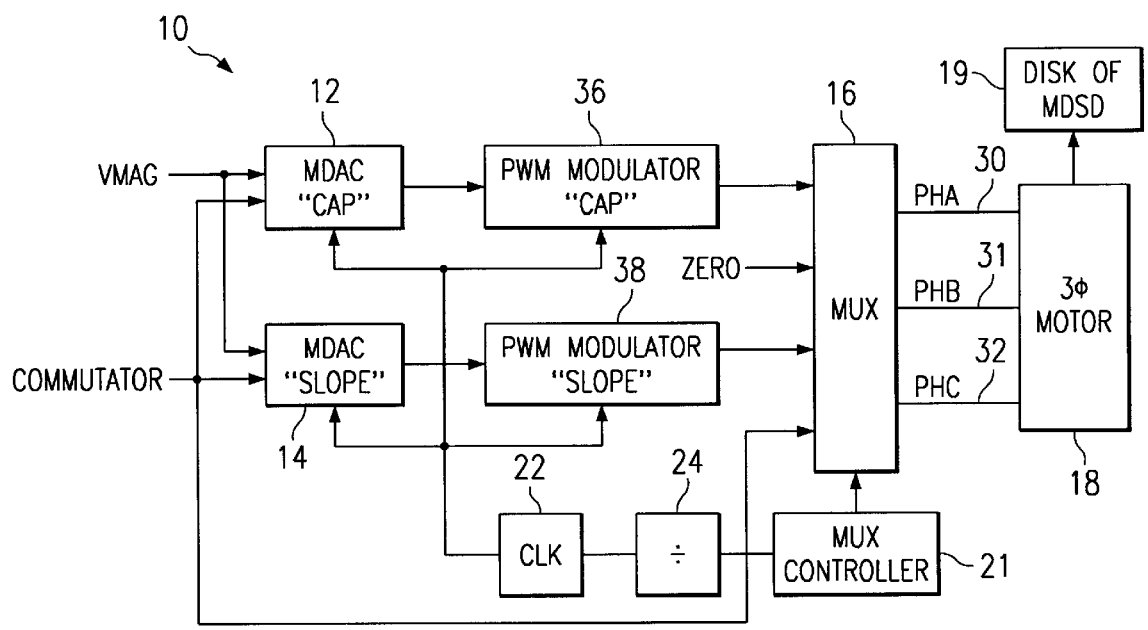
FIG. 2 is a block diagram of a portion of a circuit for providing driving signals to a polyphase dc motor, in accordance with a preferred embodiment of the invention.

A portion 10 of a circuit for providing driving signals to a polyphase dc motor, in accordance with a preferred embodiment of the invention, is shown in FIG. 2. The circuit includes a "cap" generating MDAC 12 and a "slope" generating MDAC 14, below described in detail. The cap and slope MDACs 12 and 14 are updated once each PWM CLK cycle and provide shaped signals for selection by a multiplexer 16 for application to the three-phase dc motor 18. The dc motor 18 turns the spindle of a disk 19, for example, used in a mass data storage device. If desired, the outputs of the MDACs 12 and 14 can be pulse width modulated in known manner by PWM modulators 36 and 38, as shown, to control the power applied to the motor 18.

The MDAC 14 generates at its output a signal that has a slope waveform that may be derived to approximate a segment of a sine wave; more particularly, a 600 segment of a sine wave. The MDAC 14 can generate the segment in either ascending or descending order, so that the ascending waveform substantially follows an "up-slope" segment 50, shown in FIG. 1, or that the descending waveform substantially follows a "down-slope" segment 52, also shown in FIG. 1. If the period of the waveforms is considered to be 360°, the "up-slope" segment 50 or "down-slope" segment 52 is of the length of (360/2n)°, where n is the number of phases of the motor.

Figure 3:
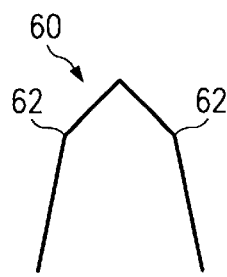
FIG. 3 shows an "up slope" waveform segment generated at the output of one of the MDAC circuits of FIG. 2 to approximate the ideal waveforms of FIG. 1, in accordance with a preferred embodiment of the invention.

Preferably, the waveforms produced by the "slope" MDAC 14 are linear waveforms, for example, as shown in the waveforms 60 of FIG. 3. As shown, the waveforms 60 included a break point 62 approximately midway between the top and bottom of the waveforms, so that the overall shape of each half of the wave form 60 is a curve that is a approximately the same as the "up-slope" segment 50 or "down slope" segment 52 shown in FIG. 1. One of the advantages that results from using linear waveforms in the operation of the MDAC 14 is that they can be generated easily by providing a linear counter that selectively counts up or down at a predetermined rate.

If desired, the MDAC 14 can include a scaling circuit to determine the overall magnitude of the waveforms 60 that are produced. The scaling circuit may include, for example, a plurality of current generators that may be individually addressably selectable to provide the biasing current necessary for the generation of the desired waveforms. Also, if desired, the waveforms 60 can be generated by subtracting a count values from the predetermine bias value.

Figure 4:
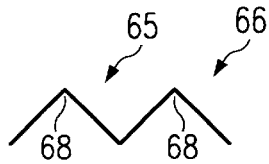
FIG. 4 shows a "cap" waveform segment generated at the output of another of the MDAC circuits of FIG. 1 to approximate the ideal waveforms of FIG. 1, in accordance with a preferred embodiment of the invention.

Similarly, the "cap" MDAC 12 can be constructed to produce two consecutive "cap" waveforms 65 and 66, as shown in FIG. 4. Each of the "cap" waveforms 65 and 66 is formed by a linear up-count to a break point 68, followed by a linear down-count to the original start value. The resulting waveforms 65 and 66 correspond to the waveforms 67 and 68 in FIG. 1. Again, by using linear waveform techniques, using, for example, linear up and down counters, the sine wave segments 67 and 68 can be easily approximated. Also, if desired, scaling circuitry can be included in the MDAC 12 so that the overall scale of the waveforms can be determined, for instance, by an addressing circuit, or the like. If the waveform has a period of 360°, each of the cap segments may be of the length of (360/2n)°, for a total length of (360/n)°, with n being the number of motor phases.

The outputs from the respective MDACs 12 and 14 are selectively applied to motor control lines 30–32 for application to the three-phase motor 18, by a multiplexer circuit 16. The multiplexer circuit 16 is controlled by a multiplexer controller 21, which receives clock pulse from a clock generator 22 that are divided by a divider circuit 24. The multiplexer controller 21 may be, for example, an address circuit that repetitively applies addresses to the multiplexer 16 to generate the repeating waveforms 45–47 shown in FIG. 1.

If desired, as shown, the output from the MDACs 12 and 14 may be pulse width modulated, for example, by respective PWM modulators 36 and 38, as shown. The pulse width modulation may be performed in known manner. Typically, a triangle wave is used as a pass waveform to allow the signal being modulated to pass only when it is larger than the value of the instantaneous triangle waveform. One of the advantages that can be realized using the circuit of FIG. 2 is that since a common clock signal derived from the clock generator 22 can be used in the generation of the linear waveform segments, described above, in the MDAC circuits 12 at 14, and the same clock signal can be used to control the timing of the pulse width modulators 36 and 38, the timing between the pulse width modulation the respective waveforms generated by the MDACs can be easily coordinated to avoid the delays and discontinuities in the signals applied to the three phase motor 18.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for operating a polyphase dc motor, comprising:

generating a set of three waveforms to provide drive voltages to respective windings of the motor, each waveform having period of 360° with a first segment with a value of zero for 120°, followed by a second segment with an "up slope" shape for 60°, followed by a third segment with two consecutive "cap" shapes for 120°, followed by a fourth segment having "down slope" shape for 60°, each waveform of said set being displaced from one another by 120°; and applying said waveforms to said respective windings of the motor.

2. The method of claim 1 further comprising pulse-width modulating the drive voltages prior to application thereof to said motor windings.

3. The method of claim 1 wherein said segments each approximate:

$$\text{VMAG}(\sin(\omega t-\phi)-\min\{\sin(\omega t), \sin(\omega t-120°), \sin(\omega t-240°)\},$$

where VMAG is a maximum amplitude of each waveform, $\omega t$ is a phase angle of the waveform, and $\phi$ is an initial phase angle.

4. The method of claim 1 wherein each of said waveform segments comprises at least one linear waveform.

5. The method of claim 4 wherein each of said waveform segments has two linear portions, with a breakpoint at a midpoint section thereof.

6. A method for reducing acoustic noise in operating a polyphase dc motor, comprising:

generating a set of n waveforms to provide drive voltages to respective windings of the motor, wherein n is a number of phases of said polyphase dc motor;

and wherein each waveform having period of 360° with a first segment with a value of zero for (360/n)°, followed by a second segment with an "up slope" shape for (360/2n)°, followed by a third segment with two consecutive "cap" shapes for (360/n)°, followed by a fourth segment having "down slope" shape for (360/2n)°, each waveform of said set being displaced from one another by (360/n)°; and applying said waveforms to said respective windings of the motor.

7. The method of claim 6 further comprising pulse-width modulating said driving voltages prior to application thereof to said windings.

8. The method of claim 6 wherein said segments each approximate:

$$\text{VMAG}(\sin(\omega t-\phi)-\min\{\sin(\omega t-0\times 360/n)°, \sin(\omega t-1\times 360/n)°, \ldots \sin(\omega t-(n-1)\times 360/n)°\}),$$

where VMAG is a maximum amplitude of each waveform, n is a number of phases of said motor, ωt is a phase angle of the waveform, and φ is an initial phase angle.

9. The method of claim 6 wherein each of said waveform segments comprises at least one linear waveform.

10. The method of claim 9 wherein each of said waveform segments has two linear portions, with a breakpoint at a midpoint section thereof.

11. A circuit for operating an n-phase dc motor, comprising:

drivers for applying n driving signal waveforms to the motor; and a source of said driving signal waveforms, each having period of 360° with a first segment with a value of zero for (360/n)°, followed by a second segment with an "up slope" shape for (360/2n)°, followed by a third segment with two consecutive "cap" shapes for (360/n)°, followed by a fourth segment having "down slope" shape for (360/2n)°, each waveform of said set being displaced from one another by (360/n)°.

12. The circuit of claim 11 wherein said source of driving signal waveforms is a first MDAC to generate said "up slope" and "down slope" waveforms, and a second MDAC to generate said "cap" shape waveforms.

13. The circuit of claim 12 wherein said driving signal waveforms comprise substantially linear segments.

14. The circuit of claim 13 wherein each of said waveforms has two linear portions, with a breakpoint at a midpoint thereof.

15. The circuit of claim 11 further comprising a multiplexer connected to receive outputs of said MDACs, said multiplexer being operated to selectively apply said outputs of said MDACs to said drivers.

16. The circuit of claim 11 further comprising a circuit for pulse-width modulating driving signal waveforms prior to application thereof to said drivers.

17. The circuit of claim 11 wherein n is 3.

18. The circuit of claim 11 wherein said segments each approximate:

$$\text{VMAG}(\sin(\omega t-\phi)-\min\{\sin(\omega t-0\times 360/n)°, \sin(\omega t-1\times 360/n)°, \ldots \sin(\omega t-(n-1)\times 360/n)°\}),$$

where VMAG is a maximum amplitude of each waveform,

ωt is a phase angle of the waveform, and

φ is an initial phase angle.

19. A disk drive product of the type having a dc brushless, Hall-less, three phase motor for rotating a data containing media, comprising:

three driver circuits for providing driving signals to selected respective sets of windings in the motor;

a source of three motor drive voltage waveforms to provide said drive signals, each waveform having period of 360° with a first segment with a value of zero for 120°, followed by a second segment with an "up slope" shape for 60°, followed by a third segment with two consecutive "cap" shapes for 120°, followed by a fourth segment having "down slope" shape for 60°, each waveform of said set being displaced from one another by 120°.

20. The disk drive product of claim 19 wherein said driver circuits each comprise a pair of FETs connected together at a driving signal node and in series between a voltage supply and a reference potential.

21. The disk drive product of claim 19 further comprising a multiplexer connected to receive said motor drive voltage waveforms and to selectively apply said motor drive voltage waveforms to said driver circuits.

22. The disk drive product of claim 19 further comprising a circuit for pulse-width modulating the motor drive voltage waveforms prior to application thereof to said driver circuits.

23. The circuit of claim 19 wherein said driving signal voltage waveforms comprise substantially linear segments.

24. The circuit of claim 23 wherein each of said waveforms has two linear portions, with a breakpoint at a midpoint thereof.

25. The circuit of claim 24 wherein said segments each approximate:

$$\text{VMAG}(\sin(\omega t-\phi)-\min\{\sin(\omega t-0\times 360/n)°, \sin(\omega t-1\times 360/n)°, \ldots \sin(\omega t-(n-1)\times 360/n)°\}),$$

where VMAG is a maximum amplitude of each waveform,

ωt is a phase angle of the waveform, and

φ is an initial phase angle.

26. The disk drive product of claim 19 wherein said data containing media is a magnetic media of a hard disk drive.

* * * * *